US009601810B2

(12) United States Patent
He et al.

(10) Patent No.: US 9,601,810 B2
(45) Date of Patent: Mar. 21, 2017

(54) METHOD FOR MANUFACTURING LITHIUM ION CELLS

(71) Applicants:Dongguan Amperex Technology Limited, Dongguan, Guangdong province (CN); Ningde Amperex Technology Limited, NingDe, Fujian Province (CN)

(72) Inventors: Ping He, NingDe (CN); Hong xin Fang, NingDe (CN); Bai qing Zhang, NingDe (CN); Man sen Li, NingDe (CN); Da wei Chen, NingDe (CN)

(73) Assignees: Dongguan Amperex Technology Limited, Dongguan (CN); Ningde Amperex Technology Limited, NingDe (CN)

( * ) Notice: Subject to any disclaimer, the term of this patent is extended or adjusted under 35 U.S.C. 154(b) by 210 days.

(21) Appl. No.: 14/316,197

(22) Filed: Jun. 26, 2014

(65) Prior Publication Data

US 2015/0000115 A1    Jan. 1, 2015

(30) Foreign Application Priority Data

Jun. 26, 2013    (CN) .......................... 2013 1 0261428

(51) Int. Cl.
*H01M 10/0585* (2010.01)
*H01M 10/0525* (2010.01)

(52) U.S. Cl.
CPC ... *H01M 10/0585* (2013.01); *H01M 10/0525* (2013.01); *H01M 2220/30* (2013.01); *Y02P 70/54* (2015.11); *Y10T 29/49108* (2015.01)

(58) Field of Classification Search
None
See application file for complete search history.

(56) References Cited

U.S. PATENT DOCUMENTS

| 6,106,975 A    * | 8/2000 | Watanabe ............... | H01M 2/26 |
| | | | 429/121 |
| 2003/0077509 A1* | 4/2003 | Probst ................. | H01M 2/0207 |
| | | | 429/162 |

(Continued)

FOREIGN PATENT DOCUMENTS

CN             102629681 A   *  8/2012   ............. H01G 11/36

*Primary Examiner* — Daniel Gatewood
(74) *Attorney, Agent, or Firm* — Alston & Bird LLP

(57) ABSTRACT

A method for manufacturing lithium ion cells includes the steps of: 1) coating a collector roll along an unreeling direction thereof to form one or more strip coated areas, two side edges of the coated area each being provided with an uncoated area to form tabs thereon; 2) compacting the coated collector roll and obtaining a compacted collector roll; 3) cutting the compacted collector roll into anode plates/cathode plates having different sizes each having a tab and rounded corners; 4) recombining an anode plate/a cathode plate with a separator; cutting the separator after recombination to form rounded corners at a position corresponding to the rounded corners of the anode plate/cathode plate and further obtain a mono-cell or a half-cell having different sizes; 5) stacking the mono-cells and half-cells into a step preliminary cell; and 6) hot pressing the stacked preliminary cell to form a whole lithium ion cell via bonding of the anode plates/cathode plates with the separator.

9 Claims, 7 Drawing Sheets

(56) References Cited

U.S. PATENT DOCUMENTS

2010/0255371 A1* 10/2010 Takayama ........... H01M 2/1673
429/210
2013/0108906 A1* 5/2013 Bhardwaj ......... H01M 10/0431
429/94

* cited by examiner

Transfer Direction

METHOD FOR MANUFACTURING LITHIUM ION CELLS

CROSS-REFERENCE TO RELATED APPLICATIONS

The present patent application claims the benefit of and priority to Chinese Patent Application No. CN 201310261428.7, filed Jun. 26, 2013, the content of which as are incorporated by reference herein in their entirety.

FIELD OF THE INVENTION

The present patent application generally relates to lithium ion batteries and, more particularly, relates to a method for manufacturing lithium ion cells.

BACKGROUND OF THE INVENTION

Generally, electronic components arranged in a portable electronic device in accordance with a predetermined fashion cooperatively defines a step-shaped inner space or other irregularly-shaped inner space which can be used to accommodate a lithium ion battery. However, conventional lithium ion batteries are generally regular cuboid-shaped. Therefore, inner space in a portable electronic device cannot be used efficiently.

To overcome the above mentioned disadvantage, step lithium ion batteries are provided to efficiently utilize free space in the portable electronic devices. However, due to special shapes of the step lithium ion batteries, the step lithium ion batteries cannot be manufactured efficiently and readily.

What is needed, therefore, is to provide a method for manufacturing lithium ion cells which can manufacture step lithium ion cells continuously and efficiently.

BRIEF SUMMARY OF THE INVENTION

One object of the present invention is to provide a method for manufacturing lithium ion cells continuously and efficiently, so as to facilitate efficient use of space within portable electronic devices.

According to one exemplary embodiment of the present invention, a method for manufacturing lithium ion cells is provided. The method includes the following steps:

1) coating a collector roll along an unreeling direction thereof to form one or more strip coated areas, two side edges of each coated area being provided with an uncoated area to form tabs thereon;

2) compacting the coated collector roll in step 1) to obtain a compacted collector roll having a predetermined compaction density;

3) cutting the compacted collector roll in step 2) into anode plates/cathode plates having different sizes each having a tab and rounded corners thereon;

4) recombining an anode plate/a cathode plate having appropriate sizes with a separator having stickiness at two surfaces thereof, and cutting the separator to form rounded corners at a position corresponding to the rounded corners of the anode plate/the cathode plate after recombination and further obtain a mono-cell or a half-cell having different sizes;

5) stacking at least one mono-cell and at least one half-cell having different sizes into a step primary cell; and 6) hot pressing the stacked primary cell to form a whole lithium ion cell via bonding of the anode plates/cathode plates with the separators.

According to one aspect of the present invention, the coated area in step 1) each includes two or more zebra stripes pattern with the uncoated area seated between two adjacent coated areas.

According to one aspect of the present invention, each coated area has a width twice as a length of the plate, and the uncoated area between the two coated areas has a width twice as that of the side uncoated area.

According to one aspect of the present invention, compacting the collector roll in step 2) adopts cold pressing or hot pressing, and preferably hot pressing.

According to one aspect of the present invention, cutting of the compacted collector roll in step 3) includes cutting the compacted collector roll along a central line of the uncoated area between the coated areas according to the coated stripe pattern and obtaining a plate strip; cutting the plate strip into a number of small plate strips each having equal predetermined width along a longitudinal axis of the plate strip; and providing each small plate strip with rounded corners and a tab and obtaining an anode plate/a cathode plate.

According to one aspect of the present invention, cutting the compacted collector roll in step 3) includes providing rounded corners on the compacted collector roll, providing tabs on the uncoated areas of the compacted collector roll, and cutting the compacted collector roll having the rounded corners and the tab into anode plate/cathode plates.

According to one aspect of the present invention, the thermal recombination in step 4) of the anode plate/cathode plate with the separator is selected from a group consisting of the following thermal recombination modes: ① two layer recombination of the separator and the cathode plate; ② two layer recombination of the separator and the anode plate; ③ four layer recombination of the separator, the cathode plate, the separator and the anode plate in turn; ④ three layer recombination of the separator, the cathode plate and the separator in turn; ⑤ three layer recombination of the separator, the anode plate and the separator in turn.

According to one embodiment, cutting the separator in step 4) is realized via tab position sensing technology.

According to one aspect of the present invention, the cutting progress in step 3) or 4) adopts laser cutting.

According to one embodiment, a hot pressing temperature in step 6) is about 60 to 110° C., and a hot pressing time in step 6) is about 1 to 600 seconds.

Compared with the prior art, the method for manufacturing lithium ion cells according to one embodiment of the present invention realizes continuous molding of the rounded corners and the tabs via the reasonable arrangement of the coated area and the uncoated area, thereby remarkably improving the production efficiency and fluency. The production efficiency will not be significantly reduced due to the special shape of the cell and, consequently, can be used to manufacture different lithium ion cells which can be compliantly accommodated in different irregular spaces.

Other advantages and novel features will be drawn from the following detailed description of the preferred embodiments with the attached drawings, in which:

BRIEF DESCRIPTION OF THE SEVERAL VIEWS OF THE DRAWING(S)

DETAILED DESCRIPTION OF THE INVENTION

Figure 1:
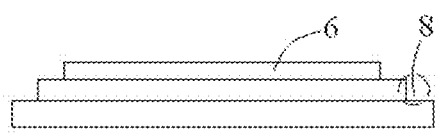
FIG. 1 depicts an exemplary front view of a step lithium ion cell according to one embodiment of the present invention.
Figure 2:
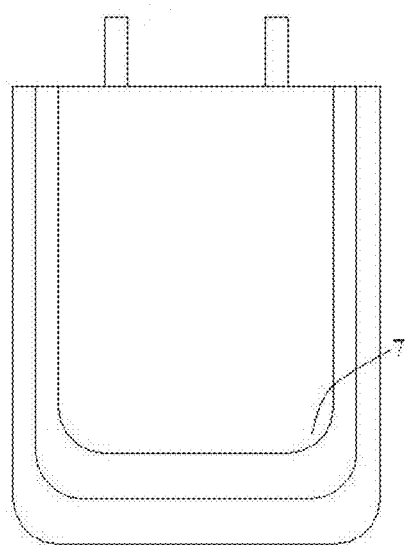
FIG. 2 depicts an exemplary top view of the step lithium ion cell as shown in FIG. 1.
Figure 3:
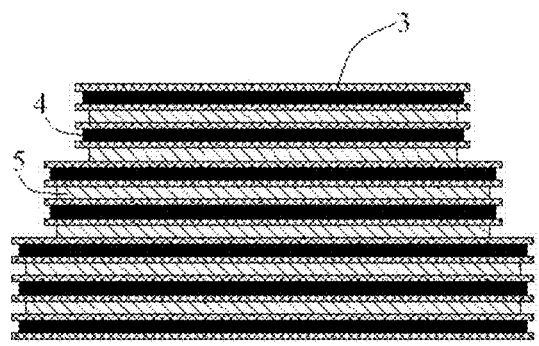
FIG. 3 depicts an exemplary cross-sectional view of the step lithium ion cell as shown in FIG. 1.
Figure 4:
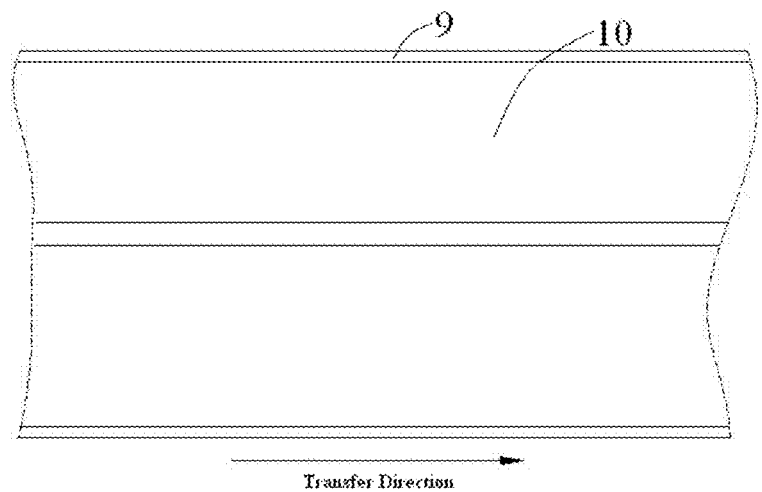
FIG. 4 depicts an exemplary front view of a compacted collector roll after coating and compacting according to one embodiment of the present invention.

One embodiment of the present invention provides a method for manufacturing step lithium ion cells. Referring to FIG. 1 to FIG. 3, the step lithium ion cell according to one embodiment of the present invention is stacked by a number of electrode groups 6 having different sizes. Each electrode group 6 includes an anode plate 5, a cathode plate 4 and a separator 3 disposed between the anode plate 5 and the cathode plate 4. Every two adjacent electrode groups 6 jointly forms a step 8 due to the different sizes. Consequently, a number of electrode groups 6 having different sizes defines a number steps 8. As shown in FIG. 2, each electrode The method for manufacturing lithium ion cells includes the steps of:

Step 1) Coating: coating a collector via an extrusion coating device along an unreeling direction thereof, i.e. a longitudinal direction of the collector as shown in FIG. 4, to form one or more strip coated areas. Two side edges of the coated area each are provided with an uncoated area to form tabs thereon. According to one embodiment of the present invention, the coated area has a pattern of zebra stripes, i.e. the coated area has two or more stripes, and one or more uncoated area are situated between two adjacent coated areas. According to one embodiment of the present invention, each coated area has a width twice as a length of the plate (length of the plate refers to the length of the plate exclude the tab along the tab extending direction), and the uncoated area between the two coated areas has a width twice as that of the side uncoated area. Additionally, the width of the coated area can be adjusted according to actual requirements, so as to manufacture plates of different specifications. Referring to the embodiment as shown in FIG. 4, there are two coated areas 10 and three uncoated areas 9, and the middle uncoated area 9 has a width twice as that of the side uncoated area 9.

Step 2) Compacting: The coated collector roll is compacted via a rolling device, so as to obtain a compacted collector roll having a predetermined compaction density. According to one embodiment of the present invention, the compacted collector roll preferably has continuous zebra stripes pattern at two surfaces thereof. The coated collector roll can be hot pressed or cold pressed, preferably hot pressed due to the desirable flexibility of the manufactured plate.

Step 3) Cutting of the plate: the compacted collector roll in step 2) are cut into anode plates/cathode plates of different sizes each having a tab 11 and rounded corners 7 thereon. It should be noted that, since an anode plate and a cathode plate are formed in a similar manner (difference only lies in the coating of an anode material and a cathode material), the figures and description of the specification do not distinguish the anode plate and the cathode plate. The cutting process generally includes 3a), 3b) as following.

Figure 5:
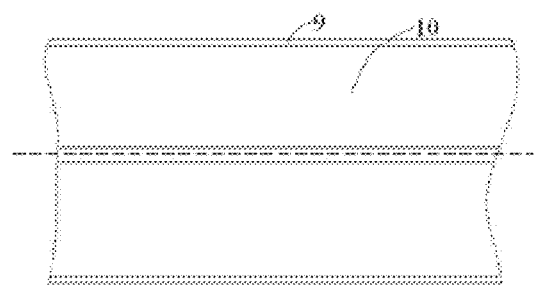
FIGS. 5 and 6 depict an exemplary cutting process of the compacted collector roll as shown in FIG. 4.
Figure 6:
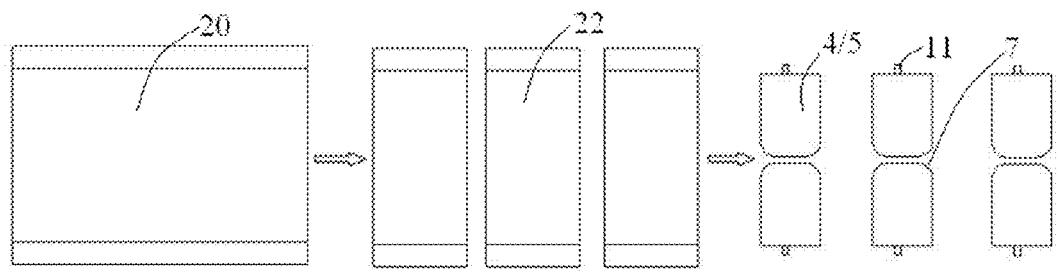

3a) Referring to FIGS. 5 and 6, according to the stripe pattern as coated, the compacted collector roll is cut along the central line of the uncoated area 9 between the two coated areas 10, so as to obtain the plate strips 20. Each plate strip 20 is cut along its longitudinal axis into a number of small plate strips 22 having equal predetermined width. The small plate strip 22 is configured to have rounded corners 7 and a tab 11, so as to obtain an anode plate 4/a cathode plate 5.

Figure 7:
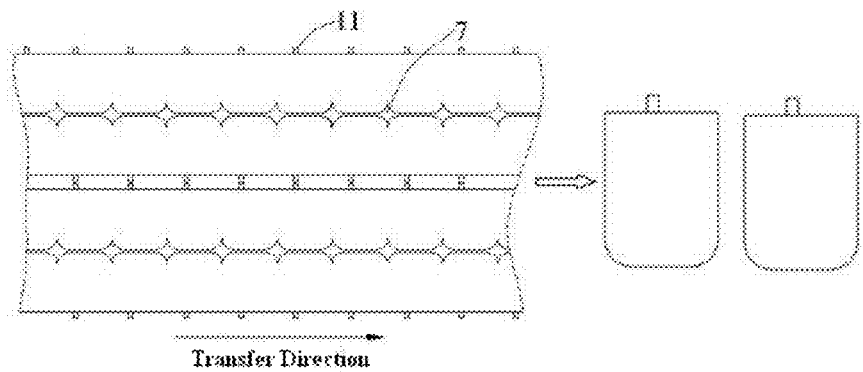
FIG. 7 depicts another exemplary cutting process of the compacted collector roll as shown in FIG. 4.

3b) Referring particularly to FIG. 7, the compacted collector roll is configured to have rounded corners 7 and tabs 11, i.e. the compacted collector roll is configured to form rounded corners 7 at predetermined sites and form tabs 11 at the uncoated area 9. The compacted collector roll having rounded corners 7 and tabs 11 thereon is then cut into an anode plate 4/a cathode plate 5.

In step 3), the cutting is preferably laser cutting, and the molding of the tabs 11 is preferably realized via induction positioning technology.

Figure 8:
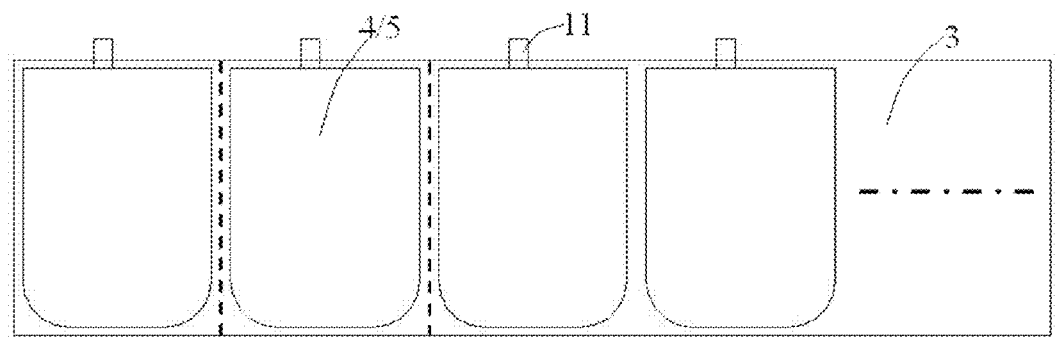
FIG. 8 depicts an exemplary recombining diagram of a plate and a separator.
Figure 9:
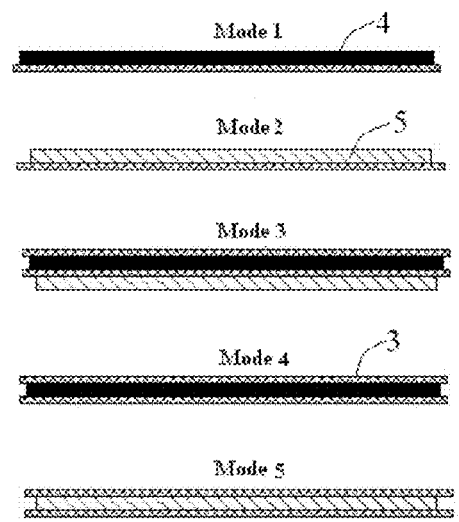
FIG. 9 depicts different recombining modes of the plate and the separator.
Figure 10:
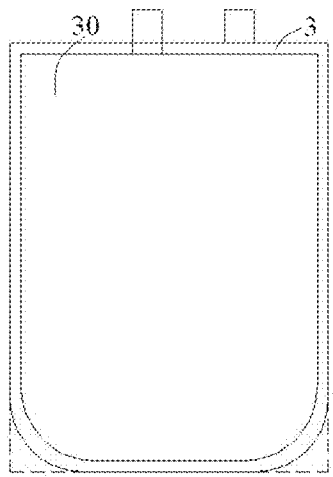
FIG. 10 depicts an exemplary front view of a mono-cell according to one embodiment of the present invention.
Figure 11:
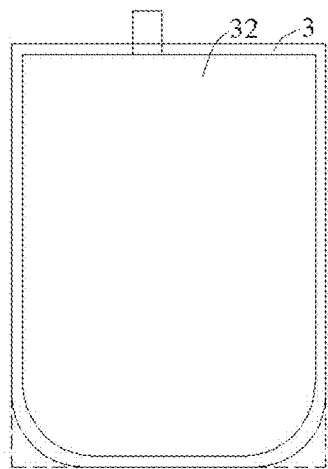
FIG. 11 depicts an exemplary front view of a half-cell according to one embodiment of the present invention.

Step 4) Manufacturing mono-cells and half-cells: i) Referring to FIG. 8, an anode plate 4/a cathode plate 5 having appropriate size is recombined with a separator 3 which has stickiness at two surfaces thereof. For instance, the separator 3 is coated with PVDF (polyvinylidene fluoride). Since the thermal recombination process is continuously carried out, the production efficiency is much higher than that of the conventional manual thermal recombination process. Referring to FIG. 9, the thermal recombination process can be selected from a group consisting of the following thermal recombination modes ① two layer recombination of the separator 3 and the cathode plate 4; ② two layer recombination of the separator 3 and the anode plate 5; ③ four layer recombination of the separator 3, the cathode plate 4, the separator 3 and the anode plate 5 in turn; ④ three layer recombination of the separator 3, the cathode plate 4 and the separator 3 in turn; ⑤ three layer recombination of the separator 3, the anode plate 5 and the separator 3 in turn. ii) Referring to FIGS. 10 and 11, after recombination, the separator 3 is cut, so as to form rounded corners at the position corresponding to the rounded corners 7 of the anode plate/the cathode plate and further obtain mono-cells 30 or half-cells 32 each having different sizes. The difference between a mono-cell 30 and a half-cell 32 lies in that, the mono-cell 30 includes an anode plate 5, a cathode plate 4 having appropriate size and a separator 3 between the anode plate 5 and the cathode plate 4, while a half-cell 32 includes an anode plate 5 and a separator 3, or only includes a cathode plate 4 and a separator 3. According to one embodiment of the present invention, the rounded corners of the separator 3 are formed via laser cutting.

Figure 12:
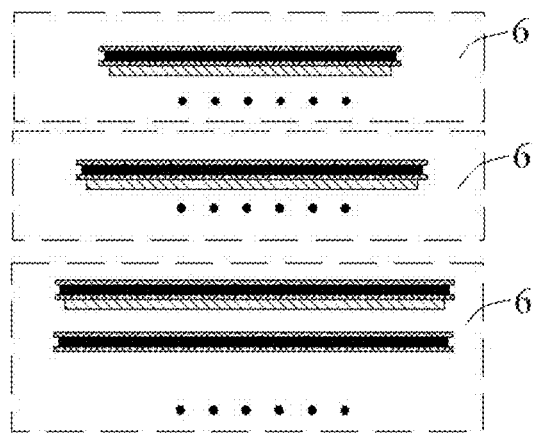
FIG. 12 depicts an exemplary cross-sectional view of a number of stacked electrode groups.

Step 5) Stacking the step lithium ion cell: referring to FIG. 12, according to actual requirement, the mono-cells 30 and the half-cells 32 having different sizes are stacked to form an electrode group 6. The electrode group 6 is stacked in a size down manner with separator 3 disposed between adjacent anode plates/cathode plates, so as to obtain the step lithium ion cell as shown in FIGS. 1 to 3.

Step 6) Hot pressing molding: the stacked step lithium ion cell is hot pressed, so that the anode plates/cathode plates and the separator 3 to form a whole, to prevent the anode plate/cathode plate 4/5 and the separator 3 from moving relative to each other. The hot pressing temperature in step 6) is about 60 to 110° C., and the hot pressing time is about 1 to 600 seconds.

Figure 13:
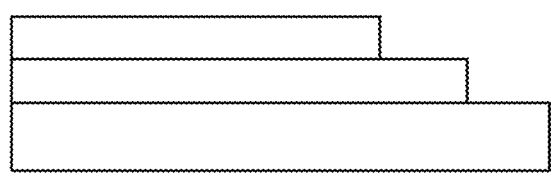
FIGS. 13 and 14 depict an exemplary front view of a step lithium ion cell in accordance with another embodiment of the present invention.
Figure 14:
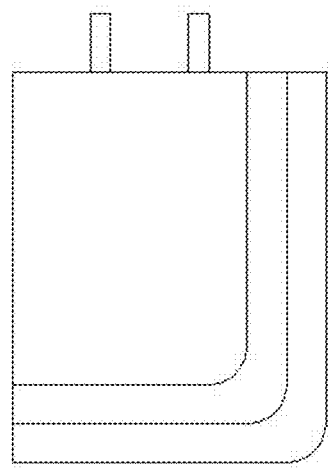

It should be noted that the method for manufacturing step lithium ion cells in accordance with the present disclosure can be used to manufacture other step lithium ion cell having different configurations, for instance a step lithium ion cell having unilateral alignment as shown in FIGS. 13 and 14, which differs from the step lithium ion cell shown in FIG. 1 to FIG. 3 in that the stacking of the electrode groups in step 5) adopts a different alignment manner.

Compared with the prior art, the method for manufacturing step lithium ion cells according to one embodiment of the present disclosure realizes continuous molding of the rounded corners and the tabs via reasonable arrangement of the coated area and the uncoated area, thereby remarkably improving the production efficiency and fluency. The production efficiency will not be significantly reduced due to the special configuration of the cell and, therefore, can be used to manufacture different lithium ion cells which can be compliantly accommodated in different irregular spaces.

While the present invention has been illustrated by the above description of the preferred embodiments thereof, while the preferred embodiments have been described in considerable detail, it is not intended to restrict or in any way limit the scope of the appended claims to such details. Additional advantages and modifications within the spirit and scope of the present invention will readily appear to those ordinary skilled in the art. Consequently, the present invention is not limited to the specific details and the illustrative examples as shown and described.

That which is claimed:

1. A method for manufacturing lithium ion cells, said method comprising the steps of:
   1) coating a collector along an unreeling direction thereof to form one or more strip coated areas, two side edges of the coated area each being provided with an uncoated area to form tabs thereon;
   2) compacting the coated collector in step 1) to obtain a compacted collector having a predetermined compaction density;
   3) cutting the compacted collector in step 2) into anode plates/cathode plates having different sizes each being provided with a tab and rounded corners thereon;
   4) recombining an anode plate/a cathode plate having appropriate sizes with a separator having stickiness at two surfaces thereof; cutting the separators after recombination to form rounded corners at a position corresponding to the rounded corners of the anode plate/the cathode plates and further obtaining a mono-cell or a half-cell having different sizes;
   5) stacking at least one mono-cell and at least one half-cell having different sizes into a step primary cell; and
   6) hot pressing the stacked primary cell to form a whole lithium ion cell via bonding of the anode plates/cathode plates with the separators.

2. The method of claim 1, wherein the one or more strip coated areas in step 1) each comprise two or more striped patterns with the uncoated area seated between two adjacent coated areas.

3. The method of claim 2, wherein each coated area has a width twice as a length of the plate, and the uncoated area between the two coated areas has a width twice as that of the side uncoated area.

4. The method of claim 1, wherein compacting the collector in step 2) adopts at least one of cold pressing or hot pressing.

5. The method of claim 1, wherein cutting of the compacted in step 3) comprises:
   cutting the compacted collector along a central line of the uncoated area between the coated areas according to the coated stripe pattern and obtaining a plate strip;
   cutting the plate strip into a plurality of small plate strips each having equal predetermined width along a longitudinal axis of the plate strip; and
   providing each small plate strip with rounded corners and a tab and obtaining an anode plate/a cathode plate.

6. The method of claim 1, wherein cutting the compacted collector in step 3) comprises:
   providing rounded corners on the compacted collector;
   providing tabs on the uncoated areas of the compacted collector; and
   cutting the compacted collector having the rounded corners and the tab into anode plates/cathode plates.

7. The method of claim 1, wherein the recombination in step 4) of the anode plate/cathode plate with the separator is selected from a group consisting of the following recombination modes: two layer recombination of the separator and the cathode plate; two layer recombination of the separator and the anode plate; four layer recombination of the separator, the cathode plate, the separator and the anode plate in turn; three layer recombination of the separator, the cathode plate and the separator in turn; three layer recombination of the separator, the anode plate and the separator in turn.

8. The method of claim 1, wherein the cutting progress in at least one of step 3) or 4) adopts laser cutting.

9. The method of claim 1, wherein a hot pressing temperature in step 6) is about 60 to 110° C., and a hot pressing time in step 6) is about 1 to 600 seconds.

* * * * *